(12) United States Patent
Blanc (10) Patent No.: US 9,694,366 B2
(45) Date of Patent: Jul. 4, 2017

(54) METHOD AND DEVICE FOR GROUPING FLOATING OBJECTS IN BATCHES WITH HYDRAULIC SUPERPOSITION OF THE OBJECTS

(71) Applicant: MAF AGROBOTIC, Montauban (FR)

(72) Inventor: Philippe Blanc, Montauban (FR)

(73) Assignee: MAF AGROBOTIC, Montauban (FR)

( * ) Notice: Subject to any disclaimer, the term of this patent is extended or adjusted under 35 U.S.C. 154(b) by 0 days.

(21) Appl. No.: 14/105,462

(22) Filed: Dec. 13, 2013

(65) Prior Publication Data

US 2014/0166551 A1    Jun. 19, 2014

Related U.S. Application Data

(60) Provisional application No. 61/773,883, filed on Mar. 7, 2013.

(30) Foreign Application Priority Data

Dec. 14, 2012   (FR) ...................................... 12 62096

(51) Int. Cl.
   *B03B 5/22*       (2006.01)
   *B03B 5/00*       (2006.01)
   *B65G 51/01*      (2006.01)

(52) U.S. Cl.
   CPC .................. *B03B 5/22* (2013.01); *B03B 5/00* (2013.01); *B65G 51/01* (2013.01); *B65G 2201/0211* (2013.01)

(58) Field of Classification Search
   CPC .... B07C 5/16; B03B 5/12; B03B 5/22; B65G 51/01; B65G 2201/0211
   USPC .... 209/552, 592, 606, 925, 162; 406/19, 86, 406/88, 93
   See application file for complete search history.

(56) References Cited

U.S. PATENT DOCUMENTS

| | | | | |
|---|---|---|---|---|
| 3,550,347 A | * | 12/1970 | Coates | ........................... 53/473 |
| 5,230,394 A | | 7/1993 | Blanc | |
| 5,280,838 A | | 1/1994 | Blanc | |
| 5,392,929 A | * | 2/1995 | Breach | ......................... 209/659 |
| 5,626,238 A | | 5/1997 | Blanc | |

(Continued)

FOREIGN PATENT DOCUMENTS

| | | |
|---|---|---|
| EP | 0 729 908 | 9/1996 |
| FR | 2808706 | 11/2001 |

(Continued)

OTHER PUBLICATIONS

French Search Report dated Jul. 18, 2013, corresponding to the Foreign Priority Application No. 1262096.

*Primary Examiner* — Michael McCullough
(74) *Attorney, Agent, or Firm* — Young & Thompson (57) ABSTRACT

The invention relates to a method and a device for grouping fragile floating objects, such as floating fruits, in batches in at least one accumulation channel. An upstream portion (12) of at least one accumulation channel is supplied with objects transported by a hydraulic current as far as a downstream end of the latter provided with a retaining/releasing device for retaining/releasing the objects. The speed of the hydraulic current is adjusted so as to bring about a hydraulic superposition of the objects retained in a superposition zone of the accumulation channel against the retaining/releasing device which is closed so as to retain the objects.

25 Claims, 4 Drawing Sheets

(56) References Cited

U.S. PATENT DOCUMENTS

| | | | |
|---|---|---|---|
| 5,645,092 A * | 7/1997 | Beaumont | 134/102.2 |
| 6,234,297 B1 | 5/2001 | Blanc | |
| 6,840,715 B2 * | 1/2005 | Crovara Pescia | B65G 51/01 406/198 |
| 7,159,373 B2 | 1/2007 | Blanc | |

FOREIGN PATENT DOCUMENTS

| | | |
|---|---|---|
| FR | 2 868 042 | 9/2005 |
| WO | 2012/056186 | 5/2012 |

\* cited by examiner

METHOD AND DEVICE FOR GROUPING FLOATING OBJECTS IN BATCHES WITH HYDRAULIC SUPERPOSITION OF THE OBJECTS

BACKGROUND OF THE INVENTION

Field of the Invention

The invention relates to a method and a device for grouping floating objects in batches, in particular fragile objects such as floating fruits or vegetables (apples, tomatoes, . . . ) or other objects, with superposition of the objects in at least one hydraulic accumulation channel for accumulation of the objects in batches.

Throughout the text, "floating object" designates any object having sufficient buoyancy in a liquid current to be able to be transported by the latter. Consequently, this terminology covers not only objects floating on the surface of the liquid current, but also, in particular, objects situated just below the surface.

In installations for grading or sorting objects, such as fragile fruits, having channels for hydraulically transporting the objects (in particular for preventing damage to them), it is advantageous to be able to reduce the total length of each accumulation channel for grouping the objects in batches, and thus the floor space required for the entire installation.

Various devices for forming a superposition of objects in such hydraulic channels have been proposed. EP 0729908 describes an extremely complex and expensive mechanical device which involves simultaneous handling of the batches of objects and, during this handling, risks of damage to these objects which are generally fragile.

FR 2808706 describes a device in which temporary storage means comprise, on the one hand, a set of submerged vertical walls, including movable and hinged panels, forming a closed contour delimiting the temporary storage space of the fruits in a plurality of superposed layers, and, on the other hand, a sleeve for forced submersion of each fruit coming from the conveyor in the space delimited by the closed contour. The submersion sleeve is inclined with an inlet end which extends into the receiving zone of the fruits and another, outlet, end directed toward the bottom of the pool and opening below the level of the lower end of the panel. These submersion means are complex, unreliable, and necessarily result in collisions between the objects and the submersion sleeve, and between the objects themselves, which are fragile, and therefore in damage to these objects.

WO 2012/056186 describes a device for grouping fragile floating objects in batches comprising a motorized stacking pusher disposed upstream of the superposition zone of each accumulation channel. This device is generally satisfactory but involves equipping each accumulation channel with a stacking device, which is still relatively expensive.

SUMMARY OF THE INVENTION

It is therefore the object of the invention to overcome these disadvantages. To this end, the invention aims to propose a method and a device for grouping fragile floating objects in batches making it possible to form a superposition of objects in a superposition zone of each accumulation channel, and to do so in an extremely simple, efficient manner without risk of damage to the objects. More particularly, it is the object of the invention to enable the superposition of the objects without requiring the addition of a specific motorized mechanism and/or one comprising numerous moving parts.

Throughout the text, the terms "upstream" and "downstream" are used in reference to the direction of circulation of the objects in the grouping device, also corresponding to the direction of circulation of the hydraulic current transporting these objects.

The invention therefore relates to a method for grouping floating objects in batches—in particular fragile objects such as floating fruits or vegetables—in at least one channel, called the accumulation channel, in which:
- a hydraulic current capable of transporting the objects is formed in each accumulation channel,
- an upstream portion of at least one accumulation channel is supplied with objects so that the floating objects are transported by the hydraulic current along the accumulation channel as far as a downstream end of the latter provided with a retaining/releasing device for retaining/releasing the objects,
- each accumulation channel having, at least in a downstream portion of the latter, called the superposition zone, a height greater than the maximum overall vertical size—in particular greater than two times the maximum overall vertical size—of each object so as to be able to receive superposed objects, wherein the speed of the hydraulic current formed in at least one accumulation channel—in particular in each accumulation channel—is adjusted so as to bring about a superposition of the objects retained in the superposition zone of the accumulation channel against the retaining/releasing device which is closed so as to retain the objects.

The inventor has actually found with surprise and by chance that a simple adjustment of the speed of the hydraulic current in an accumulation channel to a sufficient value suffices to bring about spontaneously a "hydraulic" superposition of the objects, the latter being pushed toward the bottom of the channel against the retaining/releasing device (which is closed to retain the objects while allowing the hydraulic current to pass through) by the sole effect of this speed of the hydraulic current. This superposition means that the objects are no longer aligned horizontally in contact with one another in a single layer at the surface of the hydraulic current. Such a superposition may consist of at least partial submersion of some of the objects vertically interposed between other objects, or even the formation of a plurality of layers of objects vertically in the superposition zone. This phenomenon occurs by direct contact of the objects between one another, but without collision. It is further possible to adjust the speed of the hydraulic current so that the submersion of the objects toward the bottom of the accumulation channel takes place gently merely under the effect of said speed.

The inventor has also surprisingly found that there is actually a speed range of the hydraulic current in which the speed is sufficient to bring about this hydraulic superposition spontaneously, but is still relatively low and does not lead to unwanted turbulence, or damage to the objects, or overflowing moreover of the accumulation channel. The objects accumulated (and possibly superposed) in the accumulation channel, and the retaining/releasing device which is pervious to the hydraulic current, indeed exhibit a pressure drop opposing the flow of the hydraulic current, which pressure drop can be relatively large and increases with the increasing height of superposition of the objects in the superposition zone itself. Consequently, one might expect that an increase in speed of the hydraulic current would actually have the effect of producing turbulence phenomena and/or an overflowing of the hydraulic current over the sides of the accumulation channel. However, this is not so, and in practice it is found that there is a speed of the hydraulic current sufficient to bring about spontaneously a superposition of the objects while the retaining/releasing device is in the closed state, without however causing turbulence phenomena that may damage the products or an overflowing of the accumulation channel.

The method according to the invention thus makes it possible to achieve in an extremely simple manner, and without adding any specific mechanical device, batches comprising objects superposed on one another in the hydraulic current—in particular in a plurality of layers of objects superposed on one another and retained by the retaining/releasing device in the superposition zone—. Moreover, this superposition is obtained hydraulically continuously, without collision of the objects against one another or against moving mechanical members, that is to say, without risk of damaging the objects themselves, even when they are extremely fragile.

The adjustment of the speed of the hydraulic current to bring about a superposition of the objects may be subject to various variants. For example, it is possible to maintain the speed of the hydraulic current permanently at a constant and single value capable of bringing about a superposition of the objects. It is also possible to count the objects (or the total weight of the objects) introduced into each accumulation channel, and to adjust the speed of the hydraulic current to a value capable of bringing about a superposition of the objects in an accumulation channel after supplying this accumulation channel with a predetermined minimum number (or weight) of objects. It is likewise possible to detect (for example with photoelectric cells) the height occupied by the objects in the accumulation channel at one or more points along the latter and to adjust the speed of the hydraulic current to a value capable of bringing about a superposition of the objects when this height corresponds to a layer of objects. The adjustment of the different speeds of the hydraulic current can be done discretely, that is to say by selecting a speed value from a plurality of predetermined values; or else continuously by continuously increasing the speed of the hydraulic current until it reaches a value from which a superposition of the objects is detected in at least one predetermined zone of the accumulation channel.

It is likewise possible to adjust the speed of the hydraulic current to a value capable of bringing about a superposition of the objects in a number of layers greater than 2. For example, the speed of the hydraulic current is adjusted to a first value as long as the number of objects introduced into an accumulation channel is less than or equal to a first number corresponding to one layer of objects in this accumulation channel; then the speed of the hydraulic current is adjusted to a second value bringing about a superposition of the objects in two layers when the number of objects introduced into the accumulation channel exceeds the first number and as long as it is less than or equal to a second number corresponding to the presence of two layers of objects superposed in the accumulation channel; then the speed of the hydraulic current is adjusted to a third value bringing about a superposition of the objects in three layers when the number of objects introduced into the accumulation channel exceeds the second number, and as long as it is less than or equal to a third number corresponding to the presence of three layers of objects superposed in the accumulation channel, etc.

Advantageously, in an advantageous variant of a method according to the invention:
  the presence of objects in an upstream zone of each accumulation channel is detected,
  in the absence of detection of objects in said upstream zone, a first speed value is assigned to the hydraulic current downstream of said upstream zone in the accumulation channel,
  on detection of the presence of objects in said upstream zone, a second speed value is assigned to the hydraulic current downstream of said upstream zone in the accumulation channel, this second value being greater than said first value and capable of bringing about a superposition of the objects in the superposition zone of the accumulation channel against the retaining/releasing device which is closed so as to retain the objects.

Said first speed value is advantageously adapted to enable the supply of objects to the superposition zone and the accumulation of objects in the superposition zone, preventing any damage to the objects under the effect of collisions of the objects on the retaining/releasing device and between themselves. Thus, in a method according to the invention, the speed of the hydraulic current is initially adjusted to a first relatively low value sufficient to start supplying the hydraulic channel with objects while minimizing the collisions of the objects against one other during this initial supply which has the effect of forming a first layer of objects floating at the surface of the hydraulic current in the accumulation channel. However, this first speed value of the hydraulic current is not necessarily sufficient itself to bring about a hydraulic superposition of the products. When objects are detected in the upstream zone, that is to say, when a first layer of objects is produced, this risk of collision no longer exists, and it is then possible to increase the speed of the hydraulic current to a second value sufficient at least for a certain time to then bring about a hydraulic superposition of the objects in the superposition zone.

Advantageously and according to the invention, the speed of the hydraulic current formed in each accumulation channel is adjusted by regulating the flow rate of liquid delivered to an upstream inlet of the accumulation channel. This flow rate regulation can itself be performed using a simple butterfly valve, by adjustment of the flow rate delivered by a pump upstream of each accumulation channel, or other valve.

Furthermore, advantageously and according to the invention, the hydraulic current is locally accelerated by a cross-sectional restriction of the accumulation channel—in particular by a projection of the bottom and/or by a restriction of the width of the accumulation channel—provided upstream—in particular at the upstream end—of said superposition zone. This sectional restriction is advantageously provided downstream—in particular immediately downstream—of said upstream zone (in which the presence of the objects is detected) and downstream—in particular immediately downstream—of said upstream portion receiving the supply of objects and a hydraulic supply.

Such a cross-sectional restriction (or neck) in an accumulation channel has the effect of locally increasing the speed of the hydraulic current. Preferably, said cross-sectional restriction of the accumulation channel is obtained by a projection of the bottom of the accumulation channel, without changing its width, and extends over a small, non-zero length upstream of said superposition zone and downstream of said upstream zone in which the presence of the objects is detected. This acceleration of the speed locally in the accumulation channel makes it possible to ensure in particular that the objects, after superposition, do not go back upstream beyond said sectional restriction, tending to realign with a lower rate of superposition when the speed of the hydraulic current is returned to said first value. Furthermore, this sectional restriction makes it possible to obtain a hydraulic superposition under the effect of the locally accelerated speed for a lower average speed value of the hydraulic current and a lower total flow rate of the hydraulic current in the accumulation channel.

In addition, advantageously and according to the invention, the speed of the hydraulic current is maintained at said second value for a predetermined time after detection of the presence of objects in said upstream zone. Advantageously and according to the invention, this time is determined to ensure that the superposition of the objects in the superposition zone has the effect of pushing all the objects in the downstream direction beyond the sectional restriction, preferably immediately downstream of the sectional restriction. In other words, said time during which the speed of the hydraulic current is adjusted to the second value bringing about the superposition of the objects is selected such that the upstream edge of the objects accumulated in the superposition zone is located downstream—in particular immediately downstream—of the zone of the accumulation channel having said sectional restriction, that is to say at the upstream end of the superposition zone. The presence of objects in said upstream zone is then no longer detected. This time is typically of the order of a few tenths of a second to a few seconds.

At the end of said predetermined time, the speed of the hydraulic current is returned to said first value adapted for supplying objects to the accumulation channel in optimal conditions. The objects continuing to be supplied into the accumulation channel accumulate against one another in the upstream direction from this upstream edge, facing the zone having said sectional restriction (that is to say above the projection of the bottom in the preferred embodiment mentioned above), until the presence of objects is detected in said upstream zone again. The process is then repeated by adjusting the speed of the hydraulic current to said second value to again achieve a superposition of objects which are pushed toward the closed retaining/releasing device.

Advantageously and according to the invention, said first speed value and the sectional restriction are chosen such that the objects can be superposed extending from downstream of the sectional restriction as far as the retaining/releasing device without tending to spread out again at a lower rate of superposition.

The entire method according to the invention can be implemented automatically with the aid of a control unit, the presence of the objects being detectable by a presence sensor such as a photoelectric cell connected to the control unit, this control unit controlling a valve actuator at the hydraulic supply inlet of each accumulation channel.

The invention extends to a device for implementing a method according to the invention.

The invention therefore also relates to a device for grouping floating objects in batches—in particular fragile objects such as floating fruits or vegetables—comprising:
  at least one channel, called the accumulation channel,
  a hydraulic supply device adapted to form, in each accumulation channel, a hydraulic current capable of transporting the objects along the accumulation channel,
  an object supply device for supplying objects to an upstream portion of each accumulation channel,
  each accumulation channel being provided, at a downstream end of the latter, with a retaining/releasing device for retaining/releasing the objects which it contains,
  each accumulation channel having, at least in a downstream portion of the latter, called the superposition zone, a height greater than the maximum overall vertical size—in particular greater than two times the maximum overall vertical size—of each object so as to be able to receive superposed objects—in particular superposed in a plurality of layers—,
wherein said hydraulic supply device is adapted to be able to form in each accumulation channel a hydraulic current having at least locally a speed capable of bringing about a superposition of the objects retained in the superposition zone of the accumulation channel against the retaining/releasing device which is closed so as to retain the objects.

Furthermore, a device according to the invention is also advantageously characterized in that:
  said hydraulic supply device comprises, upstream of each accumulation channel, a controlled valve, called the channel valve, arranged so as to be able to be placed in at least one first position corresponding to a first average speed value of the hydraulic current in said accumulation channel, and in at least one second position corresponding to at least one second average speed value, greater than each first value, of the hydraulic current capable of bringing about a superposition of the objects in the superposition zone of the accumulation channel against the retaining/releasing device which is closed so as to retain the objects,
  it comprises a control unit adapted to control each channel valve between said positions.

Each channel valve and/or said control unit can be adapted to allow adjustment of the channel valve in only one first position corresponding to only one first speed value, or else in a plurality of positions that can be described as the first position, that is to say allowing an adjustment of the speed of the hydraulic current to a value that can be described as the first value (adapted to allow the initial supply of objects to the superposition zone and the accumulation of objects in the superposition zone in a first layer). Similarly, each channel valve and/or said control unit can be adapted to allow adjustment of the channel valve in only one second position corresponding to only one second speed value, or else in a plurality of positions that can be described as the second position, that is to say, bringing about a hydraulic superposition of the objects in the superposition zone.

Advantageously and according to the invention, each channel valve is adapted to allow adjustment of the flow rate of the hydraulic current in the accumulation channel according to said position of this channel valve. Each channel valve can equally well be a proportional valve, for example a butterfly valve, or an on-off valve (flap valve, check valve, pressure valve etc.).

Advantageously, a device according to the invention is also characterized in that it further comprises at least one presence sensor for sensing the presence of objects in an upstream zone of each accumulation channel, each presence sensor being connected to the control unit, and in that the control unit is adapted to drive each channel valve into a second position (capable of bringing about a hydraulic superposition as mentioned above) on reception of a signal from the presence sensor representative of the presence of objects in said upstream zone of the corresponding accumulation channel.

Furthermore, advantageously and according to the invention, each accumulation channel comprises a cross-sectional restriction provided upstream of said superposition zone. This cross-sectional restriction zone is also provided downstream of the object supply device and the hydraulic supply device. Such a cross-sectional restriction (or neck) allows the speed of the hydraulic current to be locally accelerated relative to the speed of the hydraulic current in the superposition zone. It can be advantageously formed by a projection or raised portion of the bottom of the accumulation channel relative to the bottom of the superposition zone. This projection is arranged such that the height of the hydraulic current at said cross-sectional restriction remains sufficient to allow the passage of the floating objects carried along by the hydraulic current. Otherwise, preferably, the projection is arranged so as to locally produce a maximum acceleration of the speed of the hydraulic current.

Advantageously and according to the invention, said presence sensor is disposed immediately upstream of said cross-sectional restriction.

The invention is applicable to a device comprising a single accumulation channel. Nevertheless, it is advantageously applicable to a device which is also characterized in that:

it comprises a plurality of accumulation channels,
said object supply device is a selective supply device comprising at least one line, called the grading line, for conveying, analyzing and sorting the objects according to predetermined criteria, said grading line comprising means for selectively discharging the objects in the different accumulation channels.

Furthermore, advantageously and according to the invention, the retaining/releasing device of each accumulation channel is pervious to the hydraulic current flowing in the accumulation channel, including when this retaining/releasing device is in the closed position for retaining the objects in the superposition zone.

In an advantageous embodiment, a device according to the invention further comprises a hydraulic channel, called the collection channel, downstream and in communication with each accumulation channel so as to be able to receive the hydraulic current and objects discharged via the retaining/releasing device in the open state, at least one receiving station for receiving batches of objects delivered by said collection channel, and a circuit for recirculation (in particular comprising at least one recirculation pump) of the hydraulic current between each receiving station for receiving batches of objects and said hydraulic supply device of each accumulation channel.

A grouping device according to the invention is for example applicable as a grading unit for fruits or vegetables, for example apples or pears, the receiving station enabling packing of each batch of objects coming from an accumulation channel in a same package, for example a crate and/or pallet box, generally referred to as "palox", as described for example in FR 2868042 or U.S. Pat. No. 7,159,373. As a variant, the receiving station may be adapted to transfer each batch to a device for individual packing or packing in groups of the objects of the batch.

The invention enables a grouping device to be made particularly compact, and does so in an extremely simple and efficient manner. It is particularly advantageous in the case of a grouping device according to the invention further characterized in that the different accumulation channels are parallel to one another and in that each grading line of the selective supply device is at least substantially orthogonal to each accumulation channel.

The invention also relates to a method implemented by a grouping device according to the invention. The invention also extends to a method and a device for grouping objects characterized in combination by all or some of the features mentioned above or below.

BRIEF DESCRIPTION OF THE DRAWING FIGURES

Other objects, features and advantages of the invention will become apparent on reading the following description given without limitation and which refers to the appended figures in which.

DETAILED DESCRIPTION OF THE INVENTION

The device according to the invention shown in the figures comprises a line 10 for conveying, analyzing and sorting the objects according to predetermined criteria, this line 10, called the grading line 10, being provided with means for selectively discharging (not shown) the objects in different accumulation channels 11 which extend generally orthogonally to the grading line 10, with an upstream end portion 12 located below the discharge means of the grading line 10. Such a grading line 10 is well known per se (cf. for example in particular EP 0729908, U.S. Pat. Nos. 7,159,373, 5,230,394, 5,280,838, 5,626,238, 6,234,297 . . . ). It has in general different stations for analyzing the objects (weighing, optical analysis, . . . ). Such a device may include any number of, e.g. from 5 to 50—accumulation channels 11 parallel to and laterally adjoining one another.

Preferably, each accumulation channel 11 is adapted to be able to receive a batch of floating objects intended to fill a single crate or pallet box at a receiving station 16 supplied by the collection channel 15. However, this is not essential and it is also possible for each batch of objects contained in an accumulation channel and released into the collection channel 15 to undergo other processing at the receiving station 16 or at a plurality of receiving stations. In any case, each accumulation channel 11 has sufficient length to be able to receive all the objects of a same batch which are to undergo a same further processing. In practice, each accumulation channel 11 receives objects having specific characteristics vis-à-vis the selection criteria, for example a predetermined grade when the objects are fruits. In a same batch, all the objects thus have the same characteristics, in particular the same grade.

The accumulation channels 11 are supplied with and have passing through them a hydraulic current (generally water, possibly with treatment additives) generated by a hydraulic supply device provided with pumping and recirculation means, as described in its general characteristics e.g. by U.S. Pat. No. 7,159,373. The hydraulic current formed in each accumulation channel 11 is adapted to be able to ensure the transporting of the objects floating in the hydraulic current, the latter having a free upper surface.

The hydraulic supply device comprises in particular a supply pipe 29 extending along all the upstream ends 22 of the accumulation channels 11 receiving the hydraulic flow generated by a recirculation pump 32, itself connected to at least one receiving station 16 and to a pipe 28 for recirculation of the hydraulic current in a closed circuit.

Figure 4:
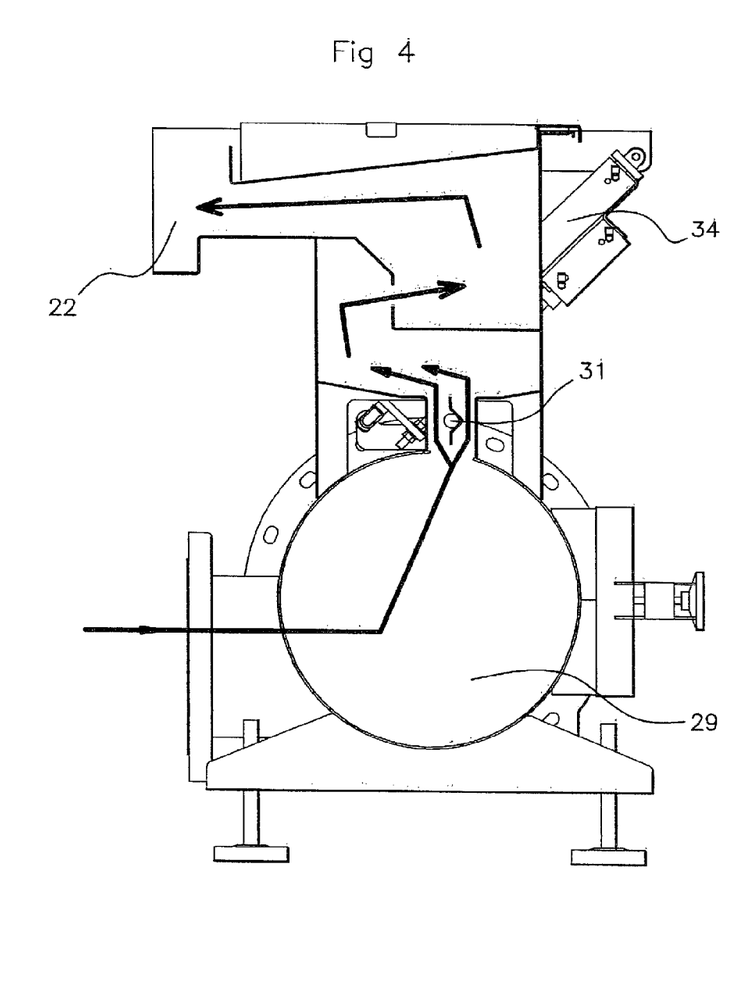
FIG. 4 is a schematic view of a detail of FIG. 3 illustrating the upstream end of the accumulation channel and the channel valve in the open, maximum flow rate position.
Figure 5:
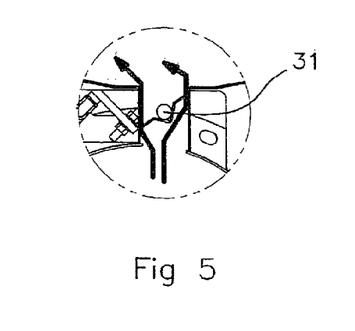
FIG. 5 is a schematic view of a detail of FIG. 4, illustrating the channel valve in the minimum flow rate position of FIG. 2.

The hydraulic supply device of each accumulation channel 11 comprises a controlled valve, called a channel valve 30, at the upstream end 22 of each accumulation channel 11. This channel valve 30 is provided with a movable member 31 such as a flap enabling regulation of the flow rate of the hydraulic current supplying the accumulation channel 11. The movable member 31 is controlled in position and moved by an actuator such as a cylinder 34 which is itself connected to a control unit of the installation as described below. In the example illustrated, the flap 31 of the channel valve 30 is rotatably mounted about a horizontal axis and is controlled in its pivoting by the cylinder 34 via a link.

Figure 1:
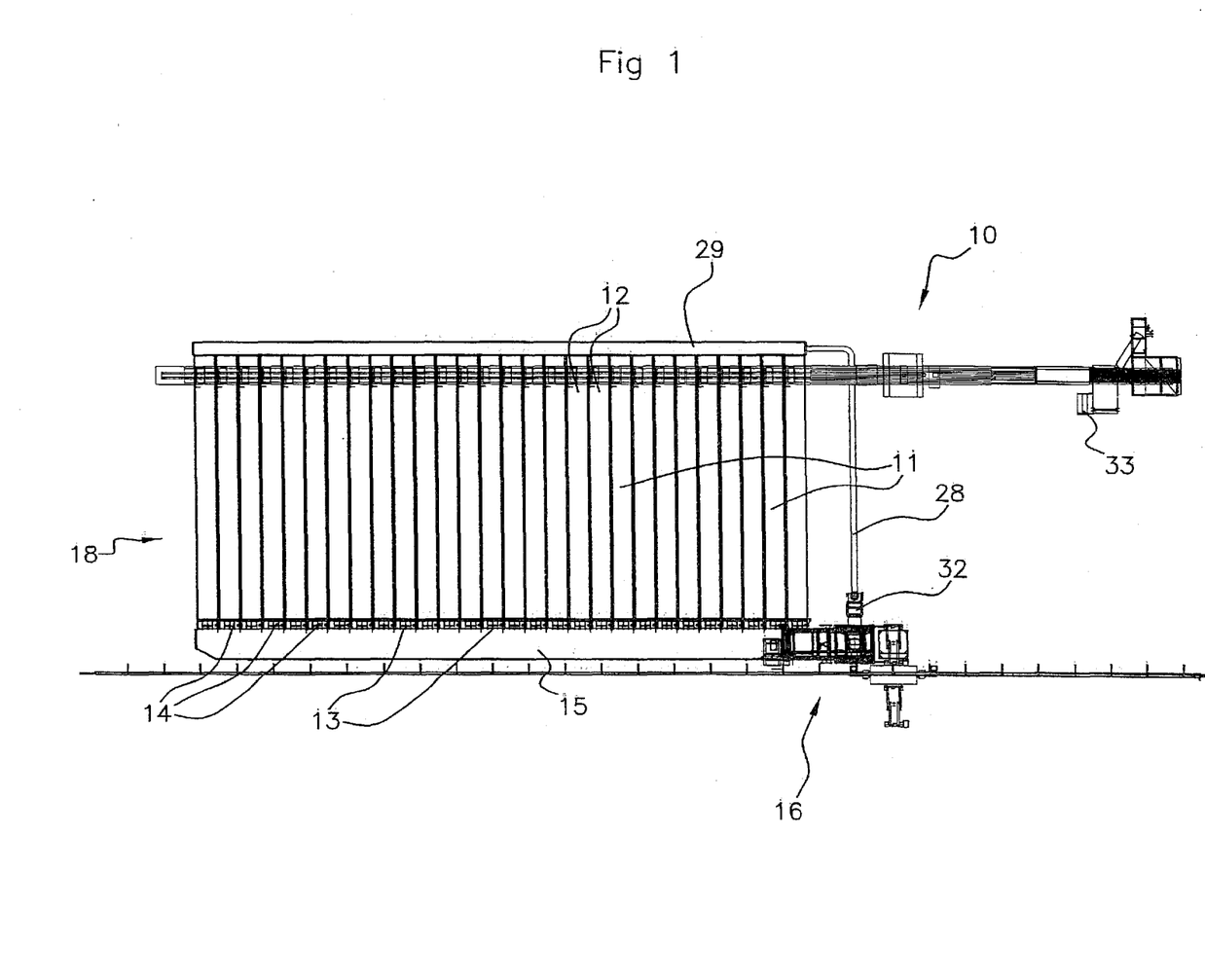
FIG. 1 is a schematic top view of a grouping device according to the invention.

The hydraulic current flows in the accumulation channels 11 from their upstream portion 12 extending under the discharge means of the grading line 10, as far as their opposite downstream end 13 provided with a retaining/releasing device 14 enabling, in a closed position, the retention of the objects in the accumulation channel while allowing the hydraulic current to pass through and, in the open position, their release under the effect of the hydraulic current to transfer them into a collection channel 15 situated downstream of all the accumulation channels 11. This retaining/releasing device 14 may be formed by a simple movable grating, as described for example by WO 2012056186.

Figure 2:
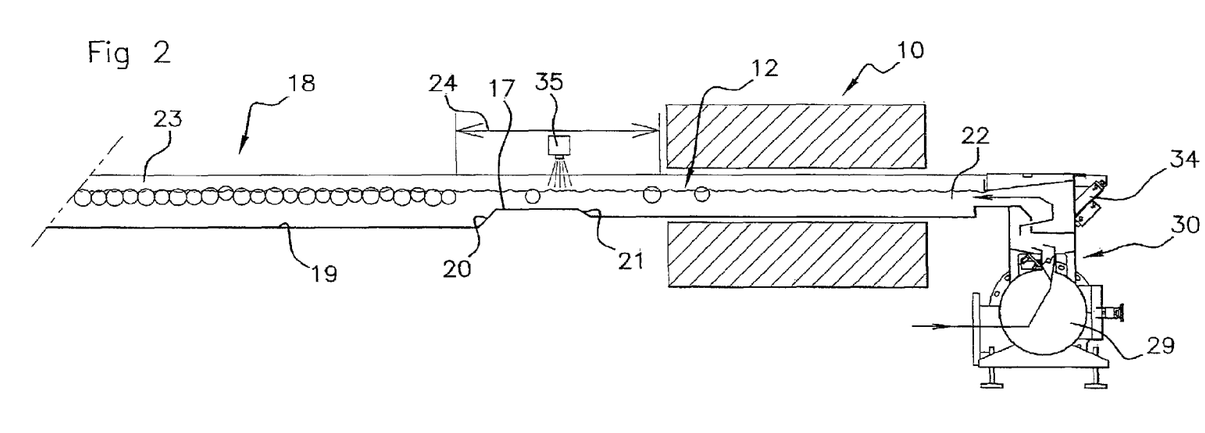
FIG. 2 is a schematic partial sectional view taken on a vertical plane in the longitudinal direction of an accumulation channel of a grouping device according to the invention, in an accumulation step of a method according to invention in which the hydraulic current flows at a first average speed of low value.
Figure 3:
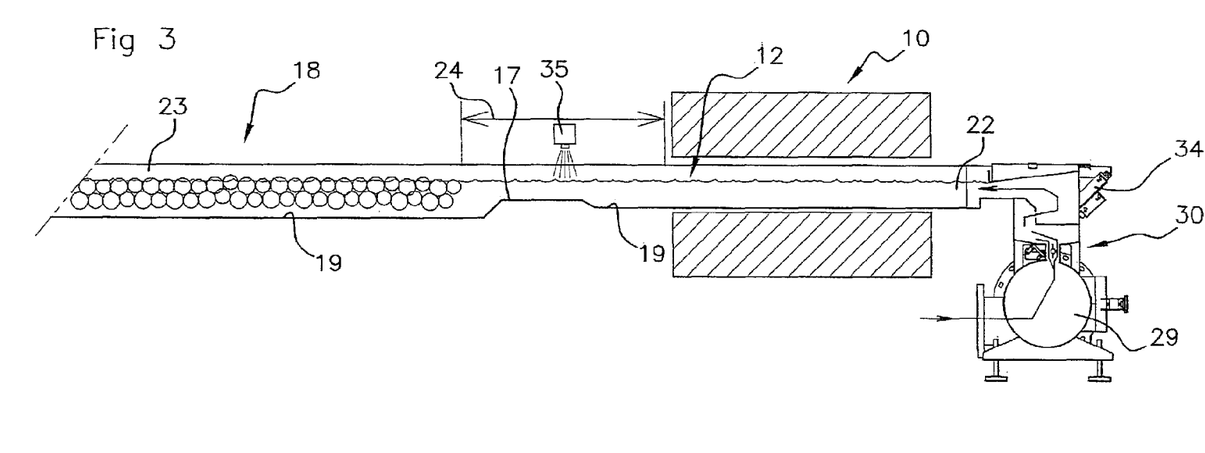
FIG. 3 is a view similar to FIG. 2, in a superposition step of a method according to the invention in which the hydraulic current flows at a greater second average speed.

FIGS. 2 and 3 show partially (upstream part) an accumulation channel 11, generally formed of a profile comprising a longitudinal horizontal bottom 19 and two vertical side walls 23.

The invention makes is possible to achieve in each accumulation channel 11 a superposition of the objects in a plurality of layers in the hydraulic current of the accumulation channel 11, in a portion of the accumulation channel called the superposition zone 18, which is located downstream of said upstream portion 12 of the accumulation channel 11. This superposition zone 18 is to have a length as large as possible vis-à-vis the total length of the accumulation channel 11 between its upstream portion 12 and its downstream end 13.

In the example shown, the bottom 19 of the accumulation channel 11 is generally horizontal and the vertical side walls 20 are of uniform height throughout the length of the accumulation channel 11. Nevertheless, provision may be made for the accumulation channel 11 to have a variable height, preferably increasing in the downstream direction, to facilitate the superposition of the objects in the superposition zone 18.

In any case, at least in the superposition zone 18, the total height of the accumulation channel 11 is greater than the maximum overall vertical size of each object so as to be able to receive superposed objects. Preferably, the total height of the accumulation channel 11 is greater than two times the maximum overall vertical size of each object, and is adapted to enable the vertical superposition of at least two objects on top of one another in the hydraulic current formed in the accumulation channel 11, preferably with a clearance between the objects forming the lowest layer in the hydraulic current, and the bottom 19, so as to prevent contact of the objects with the bottom 19 and to allow a free flow of the hydraulic current in the accumulation channel 11.

More precisely, the total height of the accumulation channel 11 is, at least in the superposition zone 18, adapted to enable the superposition of the objects on top of one another, according to the number of layers of objects desired in this superposition zone 18, and with sufficient clearance maintained between the objects and the bottom 19. Thus, if it is desired to form at least three layers, the height of the hydraulic current formed in the accumulation channel 11 must be sufficient to be able to receive these three layers, with a clearance as mentioned above. It should be noted that in the superposition zone 18, the floating objects such as fruits are not necessarily superposed strictly in uniform and homogeneous layers, but rather overlap one another partially to a greater or lesser extent, some of the objects being pushed downward for greater submersion, others possibly being pushed upward and being less submerged.

Each accumulation channel 11 is provided, immediately downstream of the upstream portion 12 of the latter receiving the objects discharged by the grading line 10, with a projection 17 of its bottom 19, this projection 17 forming, relative to the superposition zone 18, a sectional restriction which has the effect of locally accelerating the speed of the hydraulic current relative to the average speed of the hydraulic current in the accumulation channel, and in particular relative to the speed of the hydraulic current at said upstream portion 12 for supplying objects and relative to the speed of the hydraulic current in the superposition zone 18. The projection 17 of the bottom 19 of each accumulation channel 11 is arranged as far upstream as possible in the accumulation channel 11, immediately downstream of the upstream portion 12 receiving the objects discharged by the grading line 10.

The projection 17 is formed of a raised portion of the bottom 19 relative to the level of this bottom 19 in the superposition zone 18. Thus, for example, while the height of the hydraulic current formed in the accumulation channel 11 is, for example, of the order of 250 mm to 300 mm in the superposition zone 18, this same hydraulic current has a height of the order of 120 mm to 180 mm directly above the projection 17. The projection 17 is continuously connected to the bottom 19 of the superposition zone 18 by a section 20 inclined downstream and to the bottom 19 of the upstream portion 12 of the accumulation channel 11 by a section 21 inclined upstream.

Preferably, the liquid is forced from the supply pipe 29, which extends at a lower level than that of the accumulation channels 11, vertically upward through each channel valve 30 to emerge at the upstream end 22 of the accumulation channel 11 which, at this end, may have a bottom which is horizontal or inclined downward and downstream until it forms said upstream portion 12 for supplying objects via the grading line 10. The height of the hydraulic current in this upstream portion 12 is not necessarily the same as that in the superposition zone 18, and in particular may be lower, for example of the order of 200 mm. In this embodiment, the projection 17 also results from a raised portion relative to the bottom of the upstream portion 12 of the accumulation channel 11.

The entire grouping device according to the invention is controlled by a control unit 33 (controller), generally formed of a computer system, adapted to control the various actuators and motors of the entire installation, in particular the grading line 10, the discharge means, the retaining/releasing devices 14 of the accumulation channels 11, the receiving station 16, the hydraulic supply device and in particular each channel valve 30 and its associated cylinder 34 . . . . This control unit 33 also receives various signals from various sensors or detectors of the device.

A photoelectric cell 35 is associated with each accumulation channel 11 in order to detect the presence of objects upstream of the superposition zone 18, and preferably upstream of the projection 17. This photoelectric cell 35 is connected to the control unit 33 and adapted to be able to deliver a signal corresponding to the detection or non-detection of floating objects opposite the photoelectric cell 35.

The control unit 33 drives each of the cylinders 34 controlling the flap 31 of each channel valve 30 according to the detection signal delivered by each photoelectric cell 35.

Figure 6:
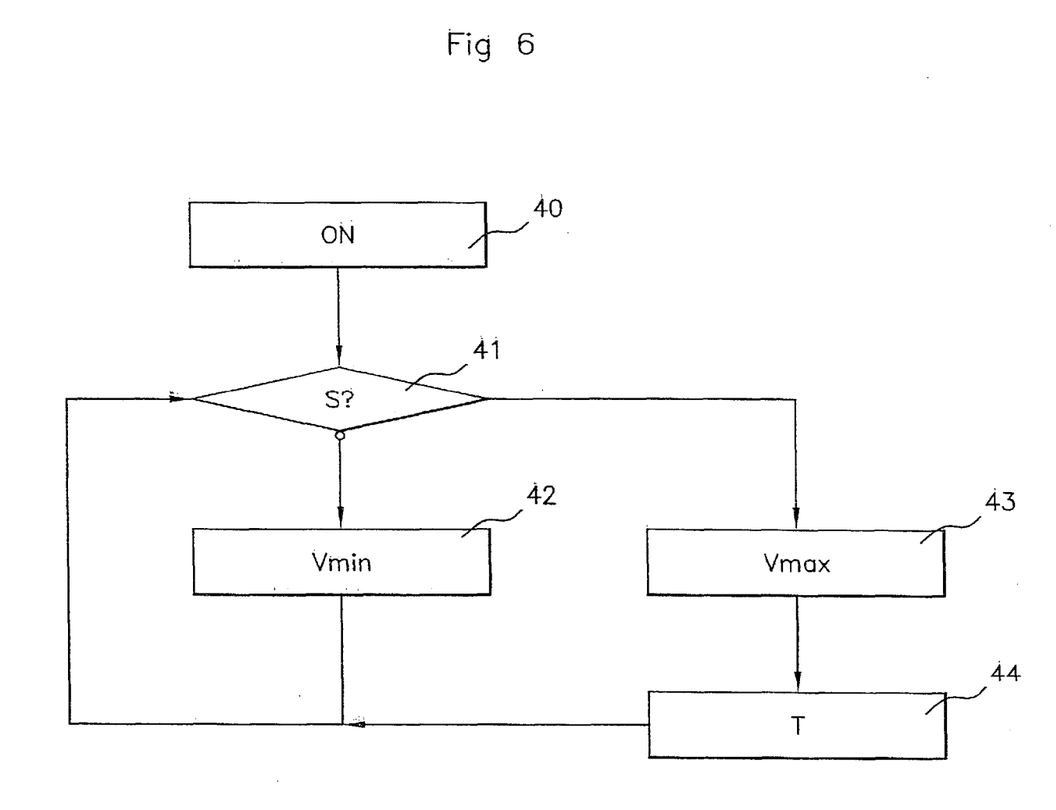
FIG. 6 is a schematic view of a flowchart of an exemplary method according to the invention.

FIG. 6 shows an exemplary method according to the invention which can be implemented by the control unit 33 for each accumulation channel 11. After a step 40 for starting the hydraulic circuit (starting the pump 32), the control unit 33 examines in the testing step 41 the state of the signal S delivered by the photoelectric cell 35.

As long as this signal S corresponds to an absence of detection of objects (for a sufficient time determined by a time delay) in the field of the photoelectric cell 35, the unit 33 controls (step 42) the cylinder 34 so as to maintain the flap 31 of the channel valve 30 in the minimum flow rate position, corresponding to a first average speed value of the hydraulic current and in particular to a relatively low first accumulation speed value Vmin of the hydraulic current passing over the projection 17 of the accumulation channel 11. This first speed value is adjusted to allow the accumulation of the objects delivered by the grading line 10 against the retaining/releasing device 14 in the closed state at the downstream end 11 of the accumulation channel 11, and to minimize collisions between the retaining/releasing device 14 and the objects and between themselves (FIG. 2). For example, the flow rate delivered by the channel valve 30 in the minimum flow rate position of the flap 31 corresponds to an average accumulation speed of the hydraulic current of the order of 5 to 10 m/min.

When the signal S delivered by the photoelectric cell 35 corresponds to a presence of objects for said sufficient time in the field of the photoelectric cell 35, the control unit 33 controls (step 43) the cylinder 34 so as to place and maintain the flap 31 of the channel valve 30 in the maximum flow rate position, corresponding to a second average speed value of the hydraulic current, and in particular to a second superposition speed value Vmax, greater than said first accumulation speed value Vmin, of the hydraulic current passing over the projection 17 of the accumulation channel 11. This second speed value is adjusted to bring about the superposition of the floating objects in the hydraulic current above one another, these objects being pushed downstream by the hydraulic current under the effect of this speed (FIG. 3) and the acceleration produced locally by the projection 17. For example, the flow rate delivered by the channel valve 30 in the maximum flow rate position of the flap 31 corresponds to an average superposition speed of the hydraulic current of the order of 10 to 25 m/min.

The control unit 33 maintains (step 44) this second superposition speed value for a predetermined time T, then repeats the testing step 41. This time T is determined so as to obtain a sufficient superposition of the objects so that the upstream edge of the superposed objects is located downstream—preferably immediately downstream—of the projection 17.

The height of the projection 17 is adapted so that the speed of the current locally above the projection 17 and in a zone, called the acceleration zone 36, extending slightly upstream and downstream of this projection 17, is greater than that of the current in the superposition zone 18, and is sufficient to prevent the objects from going back upstream when the speed of the hydraulic current returns to the first accumulation speed Vmin, after the objects have been superposed in the superposition zone 18. Indeed, the superposed objects tend, under the effect of their own weight in particular, to spread out again into a single layer floating at the surface of the hydraulic current. The acceleration of the speed formed by the projection 17 opposes this phenomenon and keeps the edge of the objects at the upstream end of the superposition zone 18 preventing any return upstream, and thus preserving the superposition state of the objects. The height of the projection 17 is also determined so as to optimize the superposition of the objects when the speed of the hydraulic current corresponds to the superposition speed Vmax. Such a projection 17 has the effect of locally accelerating the speed of the hydraulic current to a considerable degree, typically of the order of 50% or more. This speed is accelerated above the projection 17 and slightly upstream and downstream of the latter, in an upstream zone 24 of the accumulation channel 11 located immediately downstream of said portion 12 for supplying objects to the accumulation channel 11 via the grading line 10.

For example, if the height of the hydraulic current above the projection 17 is of the order of 145 mm, while it is of the order of 230 mm in the superposition zone 18, when the accumulation speed of the hydraulic current is of the order of 6 m/min in the superposition zone 18, the local speed is 9.5 m/min above the projection 17, i.e. an increase of 60%. Similarly, if the superposition speed of the hydraulic current is of the order of 14 m/min in the superposition zone 18, the local speed is 22 m/min above the projection 17, i.e. again an increase of 60%.

It should be noted that the photoelectric cell 35 triggering the transition from an accumulation speed to a superposition speed and vice versa is preferably located upstream of the projection 17 so that the transition from the accumulation speed to the superposition speed occurs only when the objects accumulate above the projection 17, despite the acceleration in speed locally formed by this projection 17 for the accumulation speed (first low flow rate position of the channel valve 30).

The above-mentioned steps 41 to 44 can be repeated until the number of objects forming a batch of objects in the superposition zone 18 is reached. This number of objects is counted for example at the discharge means of the grading line 10, the latter being adapted to discharge the objects individually. When the number of objects corresponding to a batch is reached, the retaining/releasing device 14 can be opened if the receiving station 16 is ready to receive and process the batch of this accumulation channel 11. The objects are then carried along by the hydraulic current into the collection channel 15.

With a method and a device according to the invention, by virtue of the superposition of the objects in the superposition zone of each accumulation channel 11, the total length of each accumulation channel 11 can be greatly reduced, achieving much greater compactness of the entire installation.

It goes without saying that the invention may be subject to numerous embodiment variants with respect to the embodiment shown in the figures and described above. In particular, there may be provided a plurality of photoelectric cells for each accumulation channel 11, in particular a second photoelectric cell located downstream of the photoelectric cell 35 triggering the transition to the superposition speed, this second photoelectric cell making it possible to trigger the return to the accumulation speed as soon as the superposition of the objects is sufficient. This second photoelectric cell may be placed immediately downstream of the projection 17.

Furthermore, there may be provided a plurality of different positions of the flap 31, corresponding to a plurality of different speed values, both in the accumulation phase and in the superposition phase. For example, the superposition speed Vmax may initially be relatively low (it should initially be just enough to begin to create a superposition of the objects) and increased as the different successive superposition phases proceed, to assume a maximum value at the end of accumulation of a batch of objects, the superposition of the objects then requiring greater energy. For example, it is possible to increase the value of the superposition speed according to the number of layers of objects superposed in the superposition zone 18.

It is also possible to provide continuous (and not discrete) variations of the position of the flap 31, and therefore the flow rate of the hydraulic current and the speed of the latter. In particular, it is possible to provide that the unit 33 continuously varies the position of the flap 31 from the accumulation speed until a sufficient value corresponding to a superposition speed is reached, that is to say, capable of bringing about a hydraulic superposition of the objects, which superposition is detected by a photoelectric cell placed downstream of the projection 17.

It should further be noted that although the projection 17 makes it possible to improve the efficiency of the superposition under the effect of the speed of the hydraulic current, it is possible to provide a device without a projection. As a variant or in combination, it is also possible to provide a reduction in width of each accumulation channel 11 to increase the speed of the hydraulic current.

Furthermore, the grading line 10 may be replaced by any other device for selective supply of the accumulation channels. And the collection channel 15 and the receiving station 16 may be replaced by any other device for processing the batches of objects discharged downstream of the accumulation channels 11.

The invention claimed is:

1. A method for grouping floating objects in batches in at least one channel, named an accumulation channel, comprising:
    forming a hydraulic current capable of transporting the objects in each accumulation channel;
    supplying an upstream portion of at least one accumulation channel with objects so that the floating objects are transported by the hydraulic current along the accumulation channel as far as a downstream end of the accumulation channel provided with a retaining/releasing device for retaining/releasing the objects;
    each accumulation channel having, at least in a downstream portion, named a superposition zone, a height greater than the maximum overall vertical size of each object so as to be able to receive superposed objects;
    forming a first layer of objects floating at the surface of the hydraulic current in the accumulation channel; and
    adjusting a speed of the hydraulic current to a value sufficient to bring about a hydraulic superposition of the objects retained in the superposition zone of the accumulation channel against the retaining/releasing device which is closed so as to retain the objects, said hydraulic superposition of the objects resulting from the effect of said sufficient value of the speed of the hydraulic current pushing the objects against the closed retaining/releasing device.

2. The method as claimed in claim 1, wherein:
    the presence of objects in an upstream zone of each accumulation channel is detected,
    in the absence of detection of objects in said upstream zone, a first speed value is assigned to the hydraulic current downstream of said upstream zone in the accumulation channel,
    on detection of the presence of objects in said upstream zone, a second speed value is assigned to the hydraulic current downstream of said upstream zone in the accumulation channel, this second value being greater than said first value and capable of bringing about a superposition of the objects in the superposition zone of the accumulation channel against the retaining/releasing device which is closed so as to retain the objects.

3. The method as claimed in claim 2, wherein the hydraulic current is locally accelerated by a cross-sectional restriction of the accumulation channel provided upstream of said superposition zone.

4. The method as claimed in claim 3, wherein the speed of the hydraulic current is maintained at said second value for a predetermined time after detection of the presence of objects in said upstream zone.

5. The method as claimed in claim 2, wherein the speed of the hydraulic current is maintained at said second value for a predetermined time after detection of the presence of objects in said upstream zone.

6. The method as claimed in claim 1, wherein the superposed objects are not aligned horizontally in contact with one another in a single layer at the surface of the hydraulic current.

7. The method as claimed in claim 1, wherein said superposition comprises at least partial submersion of some of the objects vertically interposed between other objects.

8. The method as claimed in claim 1, wherein said superposition comprises a formation of a plurality of layers of objects vertically in the superposition zone.

9. The method as claimed in claim 1, wherein said superposition of the objects resulting from the objects being pushed against the closed retaining/releasing device by the sole effect of said sufficient value of the speed of the hydraulic current.

10. A device for grouping floating objects in batches comprising:
    at least one channel, named an accumulation channel;
    a hydraulic supply device adapted to form, in each accumulation channel, a hydraulic current capable of transporting the floating objects along the accumulation channel;
    an object supply device for supplying objects to an upstream portion of each accumulation channel;
    each accumulation channel being provided, at a downstream end, with a retaining/releasing device for retaining/releasing the objects which the accumulation channel contains; and
    each accumulation channel having, at least in a downstream portion, named a superposition zone, a height greater than the maximum overall vertical size of each object so as to be able to receive superposed objects, wherein each accumulation channel comprises a projection of a bottom of the accumulation channel forming a cross-sectional restriction provided upstream of said superposition zone, said cross-sectional restriction allowing the speed of the hydraulic current to be locally accelerated, wherein said hydraulic supply device is configured to adjust a speed of the hydraulic current to a value sufficient to bring about a hydraulic superposition of the objects retained in the superposition zone of the accumulation channel against the retaining/releasing device which is closed so as to retain the objects, said hydraulic superposition of the objects resulting from the effect of said sufficient value of the speed of the hydraulic current pushing the objects against the closed retaining/releasing device.

11. The device as claimed in claim 10, wherein:
the device comprises a plurality of accumulation channels,
said object supply device is a selective supply device comprising at least one line, named a grading line, for conveying, analyzing and sorting the objects according to predetermined criteria, said grading line comprising means for selectively discharging the objects in the different accumulation channels.

12. The device as claimed in claim 11, wherein the different accumulation channels are parallel to one another and wherein each grading line of the selective supply device is at least substantially orthogonal to each accumulation channel.

13. The device as claimed in claim 10, wherein the retaining/releasing device is pervious to the hydraulic current flowing in the accumulation channel.

14. The device as claimed in claim 10, wherein the device further comprises a hydraulic channel, named a collection channel, downstream and in communication with each accumulation channel so as to be able to receive the hydraulic current and objects discharged via the retaining/releasing device, at least one receiving station for receiving batches of objects delivered by said collection channel, and a circuit for recirculation of the hydraulic current between each receiving station for receiving batches of objects and said hydraulic supply device of each accumulation channel.

15. The device as claimed in claim 10, wherein said hydraulic supply device is configured to adjust the speed of the hydraulic current of the objects so that said hydraulic superposition results from the objects being pushed against the closed retaining/releasing device by the sole effect of said sufficient value of the speed of the hydraulic current.

16. The device according to claim 10, wherein said hydraulic supply device is configured to form a first layer of objects floating at the surface of the hydraulic current in the accumulation channel.

17. A device for grouping floating objects in batches comprising:
at least one channel, named an accumulation channel;
a hydraulic supply device adapted to form, in each accumulation channel, a hydraulic current capable of transporting the floating objects along the accumulation channel;
an object supply device for supplying objects to an upstream portion of each accumulation channel;

each accumulation channel being provided, at a downstream end, with a retaining/releasing device for retaining/releasing the objects which the accumulation channel contains; and each accumulation channel having, at least in a downstream portion, named a superposition zone, a height greater than the maximum overall vertical size of each object so as to be able to receive superposed objects, wherein said hydraulic supply device is configured to form a first layer of objects floating at the surface of the hydraulic current in the accumulation channel, said hydraulic supply device is configured to adjust a speed of the hydraulic current to a value sufficient to bring about a hydraulic superposition of the objects retained in the superposition zone of the accumulation channel against the retaining/releasing device which is closed so as to retain the objects, said hydraulic superposition of the objects resulting from the effect of said sufficient value of the speed of the hydraulic current pushing the objects against the closed retaining/releasing device, said hydraulic supply device comprises, upstream of each accumulation channel, a controlled valve, named a channel valve, arranged so as to be able to be placed in at least one first position corresponding to a first average speed value of the hydraulic current in said accumulation channel, and in at least one second position corresponding to at least one second average speed value, greater than each first value, of the hydraulic current capable of bringing about a superposition of the objects in the superposition zone of the accumulation channel against the retaining/releasing device which is closed so as to retain the objects, and a control unit is adapted to control each channel valve between said positions.

18. The device as claimed in claim 17, wherein the device comprises at least one presence sensor for sensing the presence of objects in an upstream zone of each accumulation channel, each presence sensor being connected to the control unit, and wherein the control unit is adapted to drive each channel valve into a second position on reception of a signal from the presence sensor representative of the presence of objects in said upstream zone of the corresponding accumulation channel.

19. The device as claimed in claim 18, wherein each accumulation channel comprises a cross-sectional restriction provided upstream of said superposition zone.

20. The device as claimed in claim 19, wherein said at least one presence sensor is disposed immediately upstream of said cross-sectional restriction.

21. The device as claimed in claim 19, wherein said cross-sectional restriction comprises a projection of the bottom of the accumulation channel.

22. The device as claimed in claim 18, wherein each accumulation channel comprises a cross-sectional restriction provided upstream of said superposition zone.

23. The device as claimed in claim 17, wherein each accumulation channel comprises a cross-sectional restriction provided upstream of said superposition zone.

24. A method for grouping floating objects in batches in at least one channel, named an accumulation channel, comprising:
forming in each accumulation channel a horizontal hydraulic current having a horizontal speed capable of horizontally transporting the objects floating in each accumulation channel;

supplying an upstream portion of at least one accumulation channel with objects floating at the surface of said horizontal hydraulic current so that the floating objects are horizontally transported by said horizontal hydraulic current along the accumulation channel as far as a downstream end of the accumulation channel provided with a retaining/releasing device for retaining/releasing the floating objects; and each accumulation channel having, at least in a downstream portion, named a superposition zone, a height greater than the maximum overall vertical size of each floating object so as to be able to receive superposed floating objects, wherein said horizontal speed of said horizontal hydraulic current formed in at least one accumulation channel is adjusted to a sufficient value so as to bring about a superposition of the floating objects retained in the superposition zone of the accumulation channel against the retaining/releasing device which is closed so as to retain the floating objects, said superposition of the floating objects resulting from the effect of said sufficient value of said horizontal speed of said horizontal hydraulic current pushing the floating objects against said closed retaining/releasing device.

25. A device for grouping floating objects in batches comprising:

at least one channel, named an accumulation channel;

a hydraulic supply device adapted to form, in each accumulation channel, a horizontal hydraulic current having a horizontal speed capable of horizontally transporting the objects floating along the accumulation channel;

an object supply device for supplying objects to an upstream portion of each accumulation channel;

each accumulation channel being provided, at a downstream end of the accumulation channel, with a retaining/releasing device for retaining/releasing the objects which the accumulation channel contains; and each accumulation channel having, at least in a downstream portion, named a superposition zone, a height greater than the maximum overall vertical size of each object so as to be able to receive superposed objects, wherein said hydraulic supply device is configured to form in each accumulation channel said horizontal hydraulic current with said horizontal speed adjusted to a sufficient value capable of bringing about a superposition of the floating objects retained in said superposition zone of the accumulation channel against said retaining/releasing device which is closed so as to retain the floating objects, said superposition of the floating objects resulting from the effect of said sufficient value of said horizontal speed of said horizontal hydraulic current pushing the floating objects against said closed retaining/releasing device.

* * * * *